May 26, 1964 W. B. WESTCOTT, JR 3,134,458
LANDING GEAR BRAKE MOUNTING
Filed March 19, 1959 2 Sheets-Sheet 1

INVENTOR.
WILLIAM B. WESTCOTT, JR.
BY
ATTORNEY

May 26, 1964 W. B. WESTCOTT, JR 3,134,458
LANDING GEAR BRAKE MOUNTING
Filed March 19, 1959 2 Sheets-Sheet 2

INVENTOR.
WILLIAM B. WESTCOTT, JR.
BY
ATTORNEY

United States Patent Office 3,134,458
Patented May 26, 1964

3,134,458
LANDING GEAR BRAKE MOUNTING
William B. Westcott, Jr., Cleveland Heights, Ohio,
assignor to Cleveland Pneumatic Industries, Inc.,
Cleveland, Ohio, a corporation of Ohio
Filed Mar. 19, 1959, Ser. No. 800,594
14 Claims. (Cl. 188—17)

This invention relates generally to aircraft landing gears and more particularly to a new and improved wheel and brake mounting structure which permits the rapid removal and replacement of the brake without removal of the aircraft wheels.

Increases in size and speed of aircraft has resulted in extensive development work in the field of landing gear and brake design. Because the gross weights of modern aircraft are high, it has become common to use dual wheels which are often arranged in a tandem relationship on an axle beam or truck. The increase in weight has compounded with the increase in speeds to provide very difficult braking problems since extremely large amounts of energy must be dissipated through braking. This is particularly true on jet type aircraft where reversed engine thrust is not very effective. Brake packages have been improved in their ability to absorb large amounts of energy by the use of high capacity heat absorption material such as beryllium; however, when the heat sink of the brake is raised to elevated temperatures during the braking operation, it is necessary to bring the heat sink back to normal temperatures before the brake again has the necessary energy absorption capability. Because the brakes are relatively dense and reach very high temperatures during landing operations, long periods of time must be provided for radaition and convection cooling. This introduces a delay in the aircraft operation and prevents the efficient utilization of the equipment. Even though the brakes are not used very much during a take-off, they must be cool prior to the take-off to provide the necessary capacity in the event of a rejected take-off. In a landing gear according to this invention, it is possible to quickly remove the entire brake and heat sink so that it can be replaced by a cool unit thus eliminating the time delay normally required for cooling. In the normal structural arrangement for dual wheels, the brake is located between the wheels on a live axle which in turn supports the landing wheels. Such structures introduce a problem in that the aircraft must be jacked and the wheels and axles removed to permit removal of the brake. In the large transport and bomber type aircrafts, aircraft jacking is a difficult time consuming operation requiring special equipment. A landing gear according to this invention permits the removal of the brake without jacking the aircraft.

The live axle structure also introduces a problem in that each revolution of the wheels during the ground maneuvering of the aircraft produces a stress reversal in the axle. Fatigue, therefore, becomes a problem and the axle structure must be heavy to overcome this fatigue problem. In a landing gear according to this invention, not only is the brake removable without removing the landing wheels but fixed axles are utilized to eliminate the fatigue problem occurring in live axles.

It is an important object of this invention to provide a new and improved aircraft landing gear brake combination which utilizes fixed axles to support dual wheels in combination with a brake removably located between the wheels connected to the wheels by a torque tube.

It is another object of this invention to provide an aircraft landing gear brake combination including dual wheels mounted on fixed axles and connected to a single centrally located brake by a torque tube structure.

It is still another object of this invention to provide a torque tube connection between the brake of an aircraft landing gear and the wheels associated therewith which does not support any of the load of the aircraft and which can be easily removed to permit removal of the brake for service or replacement.

It is still another object of this invention to provide an aircraft landing gear combination wherein the brake torques are transmitted to the aircraft wheels through a torque tube and the structural load on the landing wheels are carried by fixed axles.

Further objects and advantages will appear from the following description and drawings, wherein.

Figure 1:
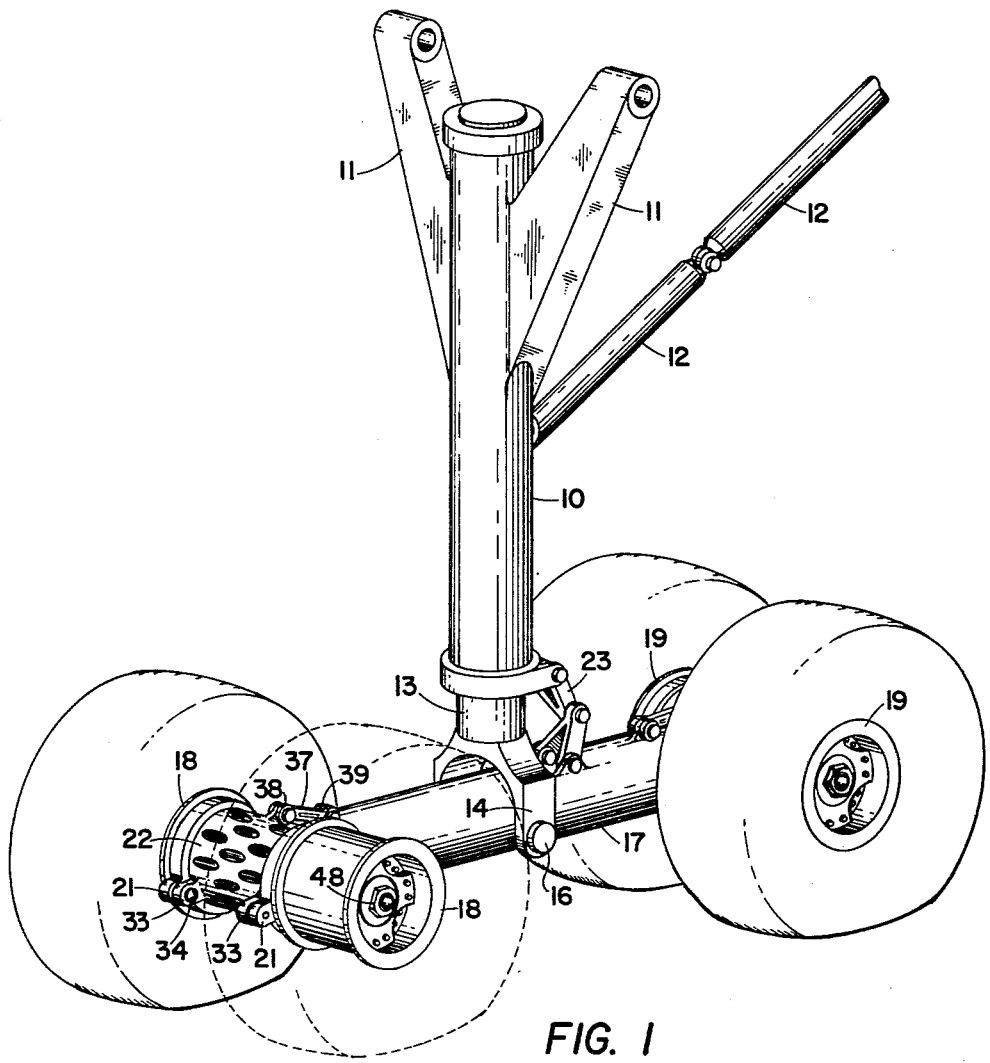
FIGURE 1 is a perspective view of a typical truck type landing gear incorporating this invention.

A typical landing gear incorporating this invention is illustrated in FIGURE 1 which includes a truck type landing gear having dual tandem landing wheels. It should be understood that although the invention is illustrated in such a truck landing gear, it could be utilized in a landing gear having dual wheels without a tandem arrangement. The illustrated landing gear includes a strut cylinder 10 formed with trunnion arms 11 adapted to be connected to the frame of an aircraft. A pair of drag braces 12 extend between the strut cylinder 10 and a remote point on the aircraft frame to maintain the strut cylinder in the substantially vertical position when the landing gear is extended. Normally, the drag braces are foldable by power actuating means for the retraction of the landing gear into the frame of the aircraft but since this portion of the structrue forms no part of this invention, it has not been shown. A strut piston 13 telescopes into the strut cylinder 10 and co-operates therewith to form the usual fluid spring damper which resiliently urges the strut piston 13 downwardly relative to the strut cylinder 10 to resiliently support the aircraft on the ground and provide damping to absorb the impact energy at landing.

The lower end of the strut piston 13 is formed with a fork 14 through which a pin 16 extends to pivotally mount an axle beam 17 at its center. The usual torque arms 23 are connected between the axle beam 17 and the strut cylinder 10 to prevent relative rotation while permitting freedom for axle movement. A forward pair of dual wheels 18 are journalled on one end of the axle beam 17 and a similar pair of rearward dual wheels 19 are journalled on the other end of the axle beam. Each end of the axle beam is formed with a fork section 21 on which the wheels are mounted. Positioned within each of the fork sections is a brake 22. The particular brake structure is not critical in this invention excepting insofar as it permits the mounting and removal but normally, the brake will be of a disc type which is hydraulically actuated and is provided with a metallic heat sump such as steel or beryllium. It includes a stationary housing 20 and a central rotor 41 connected by a series of interengaging discs which clamp to resist relative rotation between the housing 20 and rotor 41.

Figure 2:
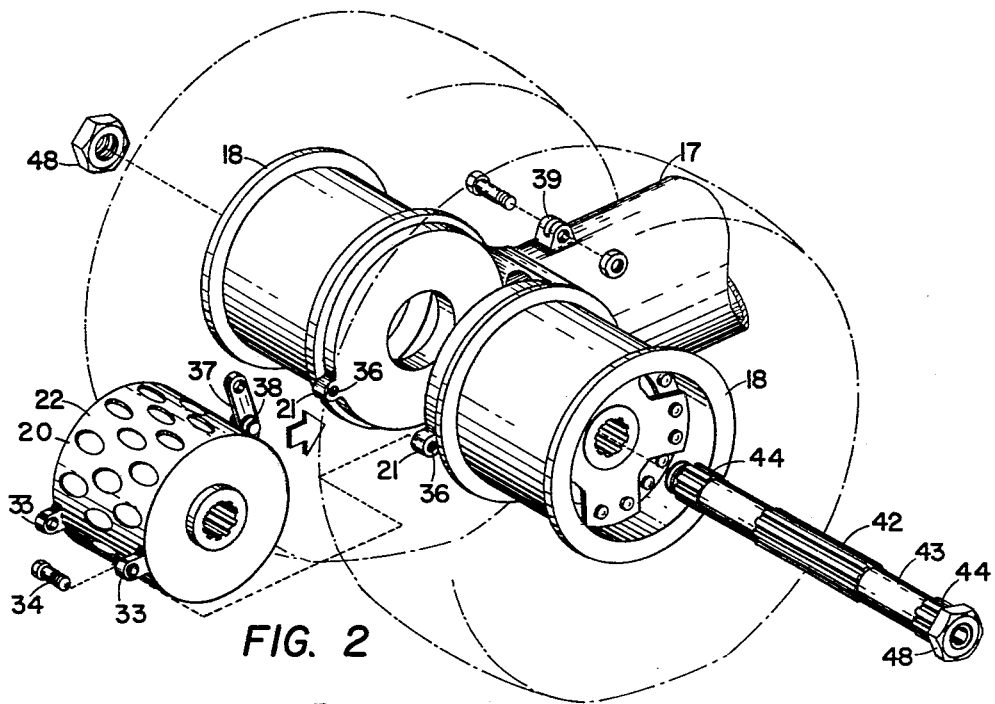
FIGURE 2 is an exploded fragmentary view of the wheel and brake structure illustrating the method of removing the brake while the wheels are supporting the aircraft load; and, FIGURE 3 is a fragmentary section showing the structural details of the brake and wheel mounting and their connection by the torque tube.
Figure 3:
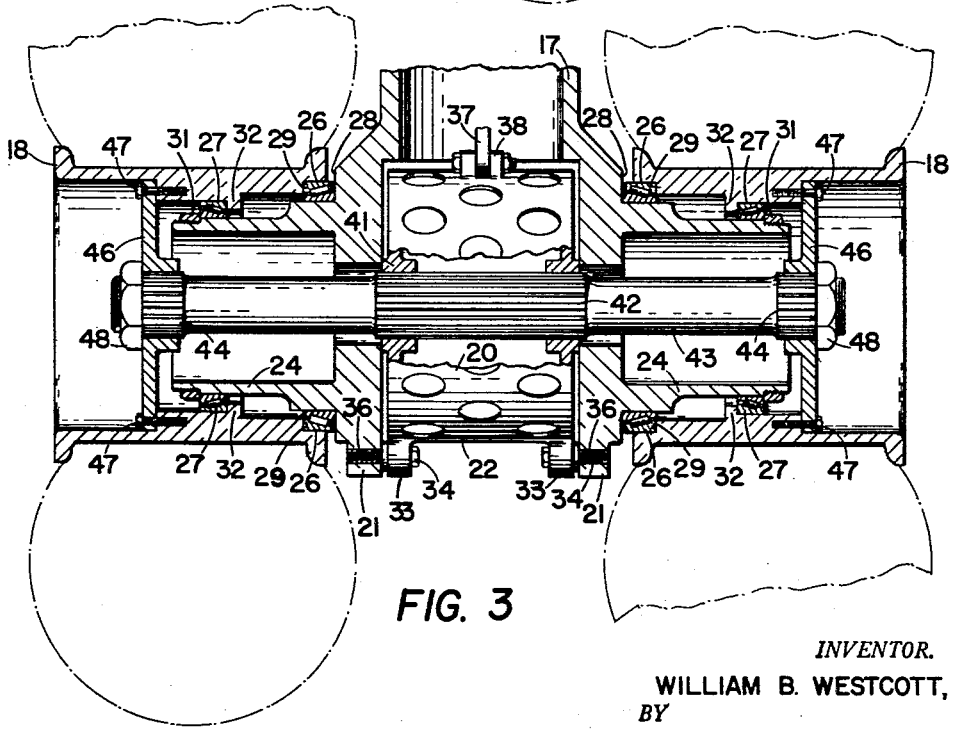

The axle and brake structure for both the forward wheels 18 and rearward wheels 19 is identical so only the forward wheels 18 and their mounting on the axle beam 17 will be discussed in detail with the understanding that this structure applies equally to the rearward wheels 19. Referring to FIGURES 2 and 3, the axle beam 17 is provided with opposite laterally extending hollow axles 24 which are normally forged integrally with the axle beam 17. The forward wheels 18 are journalled for rotation relative to the associated axles 24 on inner and outer bearings 26 and 27 respectively. The inner race of each inner bearing 26 is seated against a shoulder 28 on the axle beam 17 and the outer race of each inner bearing engages a shoulder 29 on the associated wheel 18. Therefore, the inner bearing prevents radially inward movement of the associated wheel relative to its respective axle as well as providing radial support. Similarly, the inner race of each outer bearing 27 is positioned against a nut 31 threaded on the end of the associated axle 24 and the outer race of each outer bearing engages a shoulder 32 on the associated wheel 18. Each outer bearing prevents outward movement of the associated wheel 18 relative to its axle and in co-operation with the inner bearing, provides both axial and radial support between each wheel and its axle. Preferably, the bearings 26 and 27 are of the tapered roller type since extremely large loads must be carried and each is arranged to provide axial as well as radial load carrying capacity.

The brake housing 20 is formed with a pair of similar projections 33 through which bolts 34 extend into tapped holes 36 in the fork section 21 of the axle beam 17. To provide a front mounting for the brake 22, a link 37 (shown best in FIGURE 1) is pivotally mounted at 38 to the brake housing 20 and at 39 on the axle beam 17. The brake assembly 22 is therefore mounted at three spaced points on the axle beam so it is securely connected thereto.

The brake rotor 41 is formed with an internal spline which meshes with an external spline 42 on a torque tube 43. The torque tube is a hollow member which extends through the brake 22 and the hollow axles 24 terminating just beyond the ends of the axles 24. An end spline 44 is formed on each end of the torque tube 43. A cap member 46 fits over each end of the torque tube and is formed with an internal spline meshing the associated end spline 44. A plurality of bolts 47 extends through each of the cap members 46 and into the associated wheel 18 to mount the cap members 46 on the wheels. A nut 48 is threaded onto each end of the torque tube 43 against the cap member 46 and co-operates therewith to axially fix the torque tube in the structure. The aircraft load is carried directly to the wheels by the bearings 26 and 27 and the torque tube 43 is not subjected to any vertical or horizontal loads. Because the axles 24 are fixed, they are not subjected to stress reversals on each revolution of the wheel so excessive fatigue is not a problem. The torque tube 43 transmits the braking torque produced by the brake from the rotor 41 to each of the wheels 18. Therefore, the tube 43 is subjected only to torques and consequently, can be made of a relatively thin tubular member.

To remove the brake assembly 22, it is merely necessary to remove one of the nuts 48 and withdraw the torque tube out the other end as shown in FIGURE 2. As soon as the torque tube is removed, the brake assembly 22 can be removed by removing the bolts 34 and disconnecting either of the pivots 38 or 39. Because the wheels are mounted on the axles independently of the torque tube, it is not necessary to jack the aircraft and the wheels can continue to carry the aircraft load during the removal or replacement of the brake assembly. Reassembly with a cool brake is accomplished by reversing the disassembly procedure. It should be understood that the hydraulic line connected to the brake assembly should be provided with quick disconnect so that the brake assembly can be easily removed.

In the larger aircraft, it has been found that a normal disc brake takes from four to six hours to cool sufficiently to provide maximum braking capabilities. However, by utilizing a structure according to this invention, the brake can be removed and a substitute brake replaced in a period of less than 15 minutes. This makes it possible to use the high energy, high heat absorbing brakes without delaying the return to air worthiness of the aircraft. The torque tube structure also makes it possible to materially reduce the weight of the structure by substantially eliminating the fatigue on the axles. The axle beam 17 is hollow, as illustrated in FIGURE 3, so the cooling air passing over the forward brake can pass through the axle beam and provide cooling for the rearward brake. To further facilitate the airflow the brake assembly 22 is formed with cooling openings as illustrated in FIGURES 1 and 3.

In some installations, a compound brake assembly will be used wherein the assembly provides two separate brakes, one of each wheel. If such a brake is used, the torque tube could be two separate members with each connecting an associated wheel and brake.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. An aircraft landing gear comprising a strut, an axle beam on said strut, hollow axles extending at right angles from opposite sides of said axle beam, a wheel journalled on each of said axles, a brake mounted on said beam between said wheels, said brake having an internally splined central rotor the rotation of which is resisted by operation of said brake, a torque member extending through said axles and brake formed with a spline meshing with said internally splined rotor, a cap member connected to each wheel beyond the end of the adjacent axle, interengaging splines of said cap member and torque member preventing relative rotation therebetween, and a fastener on each end of said torque member engaging the associated cap member, removal of said fastener permitting removal of said torque member and brake while said wheels are journalled on said axle.

2. An aircraft landing gear comprising an elongated wheel support, a pair of spaced hollow axles extending at right angles from opposite sides of the support, a wheel journalled on each of the axles, a brake mounted on the support between the wheels, means removably securing the elongated wheel support to the brake, means removably securing the brake to each of the axles, a torque member extending through the axles and through the brake, means on the torque member and on the brake nonrotatably mounting the brake on the torque member, a cap member connected to each wheel and the adjacent end of the torque member preventing relative rotation therebetween, and a fastener on one end of the torque member engaging the associated cap member, removal of the torque member while the wheels are journalled on the axles and disconnection of the first and second named means permitting removal of the brake from between the wheels.

3. An aircraft landing gear comprising an elongated strut formed with a pair of spaced longitudinally extending portions adjacent one end thereof, an integrally formed hollow axle on each of said portions, said axles extending coaxially in opposite directions from the associated portions, a ground engaging wheel journaled on each axle, a brake having a rotatable member, mounting means removably mounting said brake between said portions with said rotatable member aligned with said axles, and torque means extending through said axles detachably connecting said wheels and rotatable member and normally preventing relative rotation therebetween, said brake, strut, mounting means and torque means being proportioned for removal of said brake while said wheels support the landing gear by movement of said brake in a direction substantially normal to the axis of said axles.

4. An aircraft landing gear comprising an elongated strut formed with a pair of spaced longitudinally extending portions adjacent one end thereof, an integrally formed fixed hollow axle on each of said portions, said axles extending coaxially in an opposite direction from the associated portions, a ground engaging wheel journaled on each axle, a brake provided with a hollow rotatable member, mounting means removably mounting said brake between said portions with said rotatable member coaxial with said brake axles, a torque member extending through both of said axles and said hollow member, connecting means normally connecting said torque member to said hollow member and wheels preventing relative rotation therebetween and permitting removal of said torque member by movement of said torque member along the axis of said axles, said brake, strut and mounting means being proportioned for removal of said brake by movement of said brake relative to said support in a direction substantially normal to the axis of said axles when said torque member is removed from said hollow member whereby said brake can be removed from said support while said wheels remain on said axles.

5. A wheel and brake assembly comprising an open ended tubular housing having axially spaced apart annular shoulders on the outside surface of said open end of said housing; a pair of wheels mounted co-axially of each other for rotation on said shoulders; an access opening into one side of said housing at a location between said wheels; a disc brake mechanism inside said housing at said access opening, said mechanism comprising a first circular member, and a hub member supported therein for rotation relative to said circular member the rotation of which is resisted upon application of said brake; means for removably fastening said first circular member to said housing interiorly thereof; a spider fastened to the outwardly directed side of each of said wheels and extending to the open end of said housing adjacent its respective wheel, and a rod extending from the spider of one wheel through said hub to the spider of the other wheel whereby said wheels and said hub are rotatable synchronously.

6. A wheel and brake assembly comprising a main longitudinal beam with two integral transverse housings spaced apart lengthwise of said beam, each said transverse housing including bearing shoulders, a pair of co-axial wheels journalled on said shoulders for rotation on the housing parallel to the beam with the beam extending between the wheels of each pair, a brake mechanism mounted in each said transverse housing intermediate the pair of wheels of such housing; each brake mechanism including rotatable braking members and means extending through its respective transverse housing for connecting said rotatable members with a pair of wheels on such housing, and non-rotatable members connected to said transverse housing.

7. An assembly according to claim 6 and further comprising an access opening into each said transverse housing intermediate the pair of wheels thereon through which opening said brake mechanism is inserted into said housing.

8. An assembly according to claim 7 wherein said beam is hollow longitudinally to intercommunicate the brake receiving regions of said transverse housing providing for an air-flow passage lengthwise through said beam and through said brake mechanism from said access opening at one transverse housing to said access opening at the other transverse housing.

9. A wheel and brake assembly comprising an open ended tubular housing having axially spaced-apart annular shoulders on the outside surface of the ends of said housing; a pair of wheels mounted co-axially of each other for rotation on said shoulders; an access opening into said housing between said wheels which access opening is narrower than the lateral spacing between the wheels on said housing; a disc brake mechanism inside said housing at said access opening, said entire brake mechanism being in the form of an integral cartridge adapted to be inserted into or removed from said housing as a complete unit through said access opening, said mechanism having a cylindrical outer shell with means for connecting the shell to said housing, and a hub member inside said outer shell rotatable relative thereto and enclosed within the envelope of said shell, the rotation between said hub member and said outer shell being resisted by operation of said brake mechanism; a spider fastened to the outwardly directed sides of each of said wheels and extending into the open end of said housing adjacent said wheel; a rod extending from each said spider inwardly through said housing and through said hub, said rod being fastened to said spiders and driving engagement with said hub whereby said wheels in said hub are rotatable synchronously.

10. A wheel and brake assembly comprising a main longitudinal beam with two hollow transverse housings integral with and spaced apart lengthwise with said beam; a pair of wheels mounted co-axially of each other for rotation on each said housing so that the wheels are parallel to the beam and the beam extends between the wheels of each pair; an access opening into each said housing between the wheels mounted thereon which access opening is narrower than the lateral spacing between the wheels on said housing; a disc brake mechanism inside each said housing at said access opening thereof, said entire brake mechanism being in the form of an integral cartridge which is adapted to be inserted into or removed from said housing as a complete unit through said access opening, said mechanism having a cylindrical outer shell with means for connecting the shell to said housing, and a hub member enclosed within the envelope of said shell supported for rotation relative to said shell and the rotation of which is resisted by operation of said brake mechanism; a spider fastened to the outwardly directed side of each wheel and extending to the open end of the housing on which such wheel is mounted, and a rod extending from the spider of each wheel through the respective housing on which such wheel is mounted and through the hub mechanism of said brake mechanism of the respective housing, said rod being fastened at its respective wheel spiders and being in driving engagement with said hub whereby said wheels and said hub are rotatable synchronously.

11. A wheel and brake assembly according to claim 9 wherein said shell of each said brake mechanism is perforated and wherein said beam is hollow to provide communication for air flow through the access opening of one said housing, through its respective brake mechanism, and through the beam, and through the brake mechanism of the other of said housings to the access opening of the latter housing.

12. A wheel and brake assembly according to claim 9 wherein means engage with said beam intermediate said housing for mounting said assembly to a vehicle.

13. A wheel and brake assembly according to claim 9 wherein said shell of said brake mechanism is of larger diameter than the diameter of said shoulders on said housing ends to which said wheels are mounted.

14. A wheel and brake assembly comprising an open ended tubular housing having axially spaced apart annular shoulders on the outside surface of said open end of said housing; a pair of wheels mounted co-axially of each other for rotation on said shoulders; an access opening into one side of said housing at a location between said wheels; a disc brake mechanism inside said housing at said access opening, said mechanism including a first non-rotatable member adapted to be removably mounted on said housing, and rotatable hub means within said first member, the rotation of said hub means relative to said first member being resisted by the operation of said brake mechanism; means for removably fastening said first non-rotatable member to said housing interiorly thereof; a spider fastened to the outwardly directed side of each of said wheels and extending to the open end of said housing adjacent its respective wheel, and torque means extending from the spider of each wheel locked against rotation relative to at least a portion of said hub means whereby the braking torques resisting rotation of said hub means resist rotation of said wheels.

References Cited in the file of this patent

UNITED STATES PATENTS

| | | |
|---|---|---|
| 2,197,926 | Dunham | Apr. 23, 1940 |
| 2,410,133 | Spatta | Oct. 29, 1946 |
| 2,532,605 | Castleberry | Dec. 5, 1950 |
| 2,555,182 | Butler | May 29, 1951 |
| 2,620,235 | Butler | Dec. 2, 1952 |
| 2,644,654 | Mercier | July 7, 1953 |
| 2,731,218 | Bonar | Jan. 17, 1956 |